(12) United States Patent
Okamoto et al.

(10) Patent No.: US 11,104,597 B2
(45) Date of Patent: Aug. 31, 2021

(54) GLASS PRODUCTION DEVICE, GLASS PRODUCTION METHOD, GLASS SUPPLY PIPE, AND MOLTEN GLASS TRANSPORT METHOD

(71) Applicant: Nippon Electric Glass Co., Ltd., Shiga (JP)

(72) Inventors: Shusuke Okamoto, Shiga (JP); Katsutoshi Fujiwara, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 219 days.

(21) Appl. No.: 16/321,073

(22) PCT Filed: Oct. 31, 2017

(86) PCT No.: PCT/JP2017/039263
§ 371 (c)(1),
(2) Date: Jan. 28, 2019

(87) PCT Pub. No.: WO2018/079810
PCT Pub. Date: May 3, 2018

(65) Prior Publication Data
US 2019/0161375 A1 May 30, 2019

(30) Foreign Application Priority Data
Oct. 31, 2016 (JP) .............................. JP2016-213169

(51) Int. Cl.
*C03B 5/235* (2006.01)
*C03B 5/26* (2006.01)
(Continued)

(52) U.S. Cl.
CPC .............. *C03B 5/235* (2013.01); *C03B 5/262* (2013.01); *C03B 7/07* (2013.01); *C03B 7/14* (2013.01)

(58) Field of Classification Search
CPC ................................... C03B 7/07; C03B 7/14
See application file for complete search history.

(56) References Cited

U.S. PATENT DOCUMENTS

2006/0122450 A1* 6/2006 Kim ........................ G21F 9/305
588/6
2009/0217709 A1 9/2009 Adelsberg et al.
(Continued)

FOREIGN PATENT DOCUMENTS

JP 2011-173787 9/2011
JP 2014-51399 3/2014
(Continued)

OTHER PUBLICATIONS

JP 2015160753 machine translation, Suzuki, Method and apparatus for producing glass plate, Sep. 7, 2015 (Year: 2015).*
(Continued)

*Primary Examiner* — Queenie S Dehghan
(74) *Attorney, Agent, or Firm* — Wenderoth, Lind & Ponack, L.L.P.

(57) ABSTRACT

A glass manufacturing apparatus includes a dissolving vessel configured to dissolve a glass raw material to produce a molten glass, a forming vessel configured to form the molten glass into a predetermined shape, and glass supply tubes configured to convey the molten glass from the dissolving vessel to the forming vessel. The glass supply tubes each include a tube body, a flange portion, which is arranged in an outer circumferential portion of the tube body and has first and second parts, an electrode portion arranged in the first part, and a temperature difference setting portion configured to cause a temperature difference between the first and second parts. The temperature difference setting portion sets a temperature of the first part to be higher than that of the second part.

2 Claims, 4 Drawing Sheets

(51) Int. Cl.
*C03B 7/07* (2006.01)
*C03B 7/14* (2006.01)

(56) References Cited

U.S. PATENT DOCUMENTS

| | | | |
|---|---|---|---|
| 2011/0204039 A1 | 8/2011 | De Angelis et al. | |
| 2012/0312053 A1 | 12/2012 | Adelsberg et al. | |
| 2014/0013806 A1* | 1/2014 | De Angelis | C03B 7/098 65/135.1 |

FOREIGN PATENT DOCUMENTS

| | | |
|---|---|---|
| JP | 2015-131761 | 7/2015 |
| JP | 5749778 | 7/2015 |
| JP | 2015-160753 | 9/2015 |

OTHER PUBLICATIONS

International Preliminary Report on Patentability and Written Opinion of the International Searching Authority dated Apr. 30, 2019 in International (PCT) Application No. PCT/JP2017/039263.
International Search Report dated Feb. 6, 2018 in International (PCT) Application No. PCT/JP2017/039263.

* cited by examiner

GLASS PRODUCTION DEVICE, GLASS PRODUCTION METHOD, GLASS SUPPLY PIPE, AND MOLTEN GLASS TRANSPORT METHOD

TECHNICAL FIELD

The present invention relates to a glass manufacturing apparatus and a glass manufacturing method for manufacturing a glass sheet, and a glass supply tube and a molten glass conveyance method for conveying a molten glass.

BACKGROUND ART

As is well known, a glass sheet is used for a flat panel display, for example, a liquid crystal display and an organic EL display. In recent years, due to the emergence of a smartphone and a tablet terminal, an increase in resolution is advancing along with a reduction in thickness and weight of a flat panel display, and in association with this, a reduction in thickness of a glass sheet is also being promoted. As a material for a glass substrate, a non-alkali glass, which is less liable to be deformed or warped due to gravity and is excellent in dimension stability in a high-temperature process, is suitably used.

As disclosed in Patent Literature 1, a glass sheet has a thin sheet shape formed through steps such as a dissolving step, a fining step, a homogenizing step, and a forming step. In this case, the non-alkali glass has a high high-temperature viscosity, and hence the non-alkali glass is transferred as a molten glass having a high temperature of 1,600° C. or more in the dissolving step, the fining step, and the homogenizing step.

In order to transfer the molten glass between the respective steps, a glass supply tube of a noble metal made of platinum, a platinum alloy, or the like is used from the viewpoint of heat resistance and oxidation resistance. In Patent literature 1, there is disclosed a glass supply tube in which an electrode portion is formed in a flange portion surrounding the circumference of a tube body in order to manage the temperature of the molten glass to be transferred. The glass supply tube is heated through the flange portion when the electrode portion is energized. In the glass supply tube, a cutout portion is formed in the electrode portion. With this, a branch path of a current is formed in the electrode portion, and hence the glass supply tube can prevent local overheating of the electrode portion.

Further, in Patent Literature 2, there is disclosed a glass supply tube (container containing platinum) in which a flange portion is formed of two rings. In the flange portion of the glass supply tube, the thickness of an inner ring of the two rings is set to be larger than the thickness of an outer ring. With this configuration, the current density of the entire flange portion can be kept to be lower than the current density in a wall of the glass supply tube (container). Thus, the direct electric heating to the wall of the glass supply tube can be efficiently performed, with the heat generation in the flange portion being minimized.

CITATION LIST

Patent Literature 1: JP 2015-131761 A
Patent Literature 2: JP 5749778 B2

SUMMARY OF INVENTION

Technical Problem

However, in any of the above-mentioned known technologies, the current density of the flange portion was not able to be variably adjusted, and hence the temperature control with high accuracy was not able to be performed. Specifically, in the glass supply tube according to Patent Literature 1, the size of the cutout portion formed in the electrode cannot be changed during transfer of the molten glass. Also in the glass supply tube according to Patent Literature 2, respective thicknesses of the inner ring and the outer ring cannot be changed during transfer of the molten glass.

The present invention has been made in view of the above-mentioned circumstances, and a technical object of the present invention is to accurately perform the temperature control of the glass supply tube.

Solution to Problem

The present invention has been made to achieve the above-mentioned object, and there is provided a glass manufacturing apparatus, comprising: a dissolving vessel configured to dissolve a glass raw material to produce a molten glass; a forming vessel configured to form the molten glass into a predetermined shape; and a glass supply tube configured to convey the molten glass from the dissolving vessel to the forming vessel, the glass supply tube comprising: a tube body; a flange portion, which is arranged in an outer circumferential portion of the tube body and has a first part and a second part; an electrode portion arranged in the first part; and a temperature difference setting portion configured to cause a temperature difference between the first part and the second part, wherein the temperature difference setting portion is configured to set a temperature of the second part to be lower than a temperature of the first part.

In the present invention, when the temperature of the second part of the flange portion is set to be lower than the temperature of the first part through use of the temperature difference setting portion, a current flowing through the flange portion can be suitably controlled. The electrode portion is arranged in the first part of the flange portion, and hence the current density of the first part is larger than the current density of the second part. When the temperature of the second part is set to be lower than the temperature of the first part, that is, when the temperature of the first part is set to be higher, the resistance value in the first part can be increased to reduce the current density thereof. Thus, in the glass manufacturing apparatus according to the present invention, the difference in current density between the first part and the second part of the flange portion can be reduced to the extent possible through use of the temperature difference setting portion. Accordingly, the temperature control of the glass supply tube can be accurately performed.

In the above-mentioned glass manufacturing device, the temperature difference setting portion comprises a first cooling device arranged in the first part and a second cooling device arranged in the second part. As described above, when the temperature of the first part in the flange portion and the temperature of the second part in the flange portion are individually decreased with the first cooling device and the second cooling device, the difference in current density between the first part and the second part can be reduced to the extent possible, and the temperature control of the glass supply tube can be accurately performed.

The present invention has been made to achieve the above-mentioned object, and there is provided a glass manufacturing method, which uses the glass manufacturing apparatus described above, comprising conveying the molten glass from the dissolving vessel to the forming vessel through use of the tube body while causing a temperature difference between the first part and the second part of the flange portion through use of the temperature difference setting portion. With this, the difference in current density between the first part and the second part of the flange portion can be reduced to the extent possible through use of the temperature difference setting portion. Accordingly, the temperature control of the glass supply tube can be accurately performed. In this case, it is desired that the temperature difference set by the temperature difference setting portion be 40° C. or more and 200° C. or less.

The present invention has been made to achieve the above-mentioned object, and there is provided a glass supply tube, which is configured to convey a molten glass, comprising: a tube body; a flange portion, which is arranged in an outer circumferential portion of the tube body and has a first part and a second part; an electrode portion arranged in the first part; and a temperature difference setting portion configured to cause a temperature difference between the first part and the second part, wherein the temperature difference setting portion is configured to set a temperature of the second part to be lower than a temperature of the first part. With this, the difference in current density between the first part and the second part of the flange portion can be reduced to the extent possible through use of the temperature difference setting portion. Accordingly, the temperature control of the glass supply tube can be accurately performed. In the above-mentioned glass supply tube, it is desired that the temperature difference setting portion comprise a first cooling device arranged in the first part and a second cooling device arranged in the second part.

The present invention has been made to achieve the above-mentioned object, and there is provided a molten glass conveyance method, which uses the glass supply tube described above, comprising conveying the molten glass through use of the tube body while causing a temperature difference between the first part and the second part of the flange portion through use of the temperature difference setting portion. With this, the difference in current density between the first part and the second part of the flange portion can be reduced to the extent possible through use of the temperature difference setting portion. Accordingly, the temperature control of the glass supply tube can be accurately performed. In this case, it is desired that the temperature difference be 40° C. or more and 200° C. or less.

Advantageous Effects of Invention

According to the present invention, the temperature control of the glass supply tube can be accurately performed.

DESCRIPTION OF EMBODIMENTS

Figure 1:
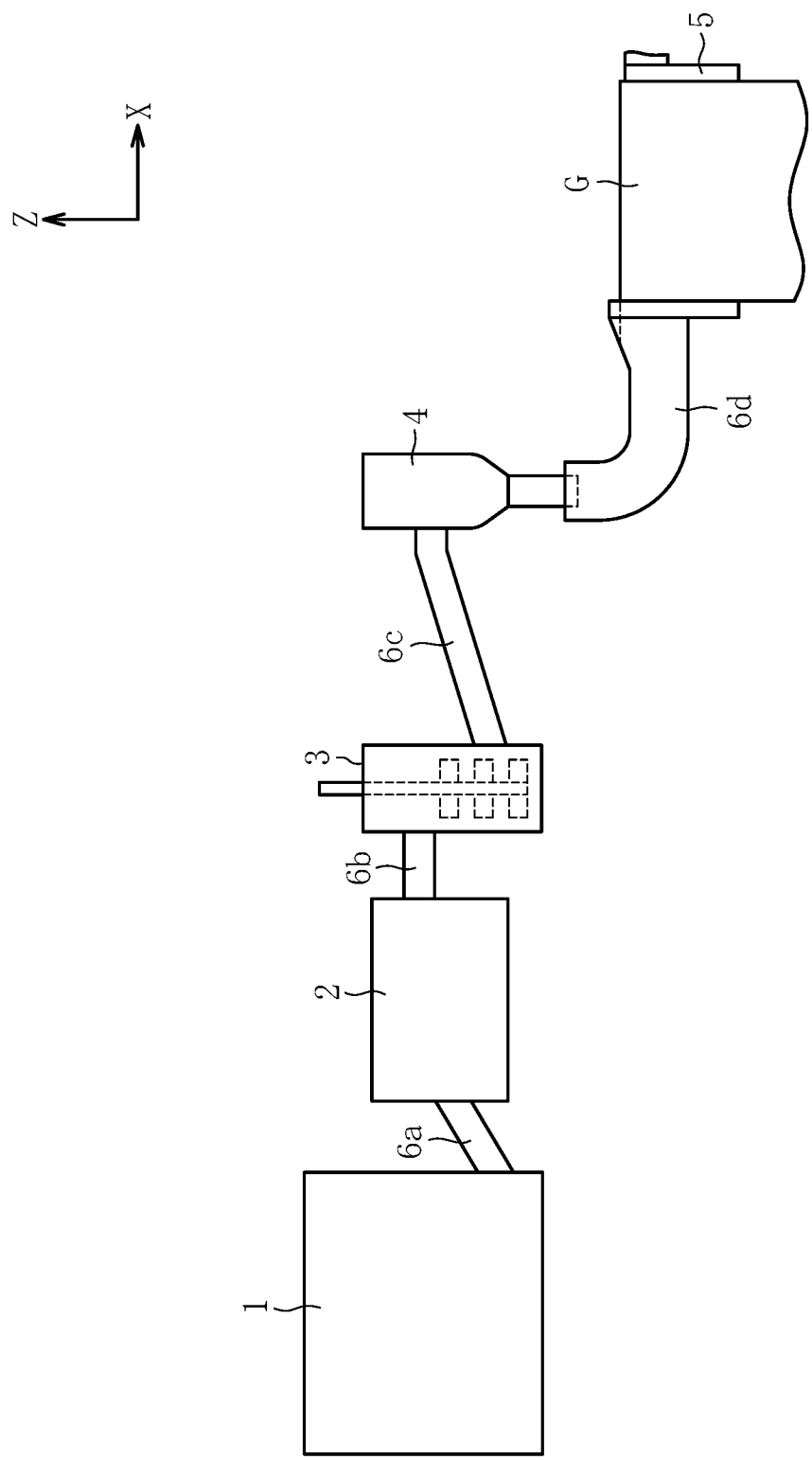
FIG. 1 is a side view for illustrating an overall configuration of a glass manufacturing apparatus.
Figure 2:
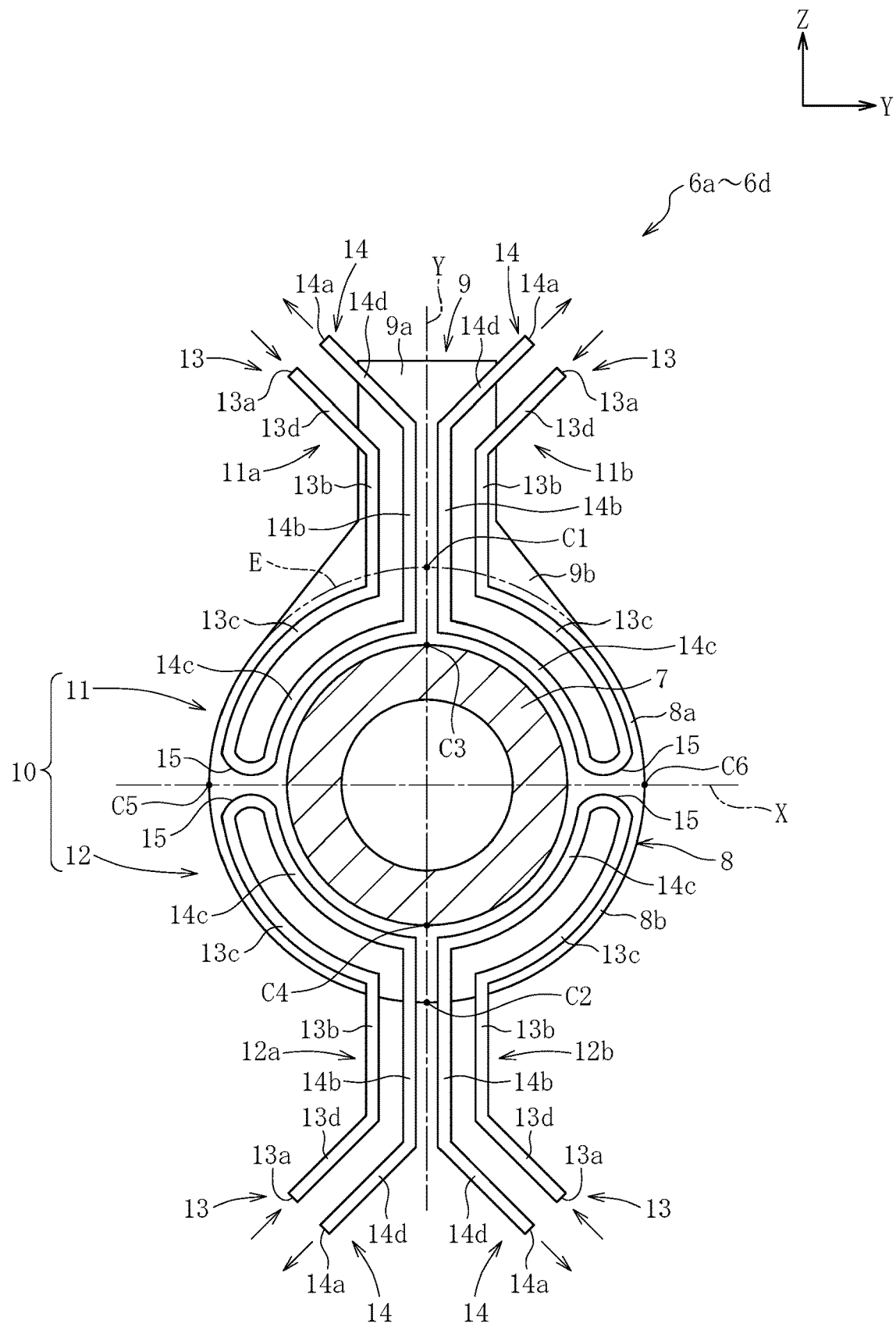
FIG. 2 is a sectional view for illustrating a main part of a glass supply tube.

Now, embodiments of the present invention are described with reference to the drawings. FIG. 1 and FIG. 2 are each a view for illustrating a glass manufacturing apparatus according to one embodiment of the present invention. As illustrated in FIG. 1, the glass manufacturing apparatus according to this embodiment comprises, in the order from an upstream side, a dissolving vessel 1, a fining vessel 2, a homogenizing vessel (stirring vessel) 3, a state adjusting vessel 4, a forming vessel 5, and glass supply tubes 6a to 6d that connect the vessels 1 to 5 to each other. Besides, the glass manufacturing apparatus may comprise an annealing furnace (not shown) and a cutting device (not shown). The annealing furnace is configured to anneal a glass sheet formed by the dissolving vessel 5. The cutting device is configured to cut the glass sheet after annealing.

The dissolving vessel 1 is a container configured to perform a dissolving step of dissolving a loaded glass raw material to obtain a molten glass G. The dissolving vessel 1 is connected to the fining vessel 2 through the glass supply tube 6a. The fining vessel 2 is a container configured to perform a fining step of fining the molten glass G, which is supplied from the dissolving vessel 1, through the function of a fining agent or the like. The fining vessel 2 is connected to the homogenizing vessel 3 through the glass supply tube 6b.

The homogenizing vessel 3 is a container configured to perform a homogenizing step of homogenizing the molten glass G by stirring the fined molten glass G with a stirring blade or the like. The homogenizing vessel 3 is connected to the state adjusting vessel 4 through the glass supply tube 6c. The state adjusting vessel 4 is a container configured to perform a state adjusting step of adjusting the molten glass G to a state suitable for forming. The state adjusting vessel 4 is connected to the forming vessel 5 through the glass supply tube 6d.

The forming vessel 5 is a container configured to form the molten glass G into a desired shape. In this embodiment, the forming vessel 5 is configured to form the molten glass G into a sheet shape by an overflow down-draw method. More specifically, the forming vessel 5 has a sectional shape (sectional shape orthogonal to the drawing sheet) substantially in a wedge shape, and an overflow groove (not shown) is formed in an upper portion of the forming vessel 5. In the forming vessel 5, the molten glass G is supplied to the overflow groove through the glass supply tube 6d, and then the molten glass G is caused to overflow the overflow groove to flow downward along side wall surfaces (side surfaces positioned on front and rear surface sides of the drawing sheet) on both sides of the forming vessel 15. The forming vessel 5 is configured to merge the molten glass G that has flowed downward in a lower top part of the side wall surfaces to form the molten glass G into a sheet shape.

The formed glass sheet has a thickness of, for example, from 0.01 mm to 10 mm, and is used as a substrate or a protective cover for a flat panel display, for example, a liquid crystal display and an organic EL display, an organic EL illumination, a solar cell, and the like. The forming vessel 5 may perform another down-draw method such as a slot down-draw method.

Now, the configuration of each of the glass supply tubes 6a to 6d is described with reference to FIG. 2. The glass supply tubes 6a to 6d each comprise a tube body 7, a flange portion 8, an electrode portion 9, and a temperature difference setting portion (temperature difference setting device) 10. The flange portion 8 is arranged in an outer circumferential portion (outer circumferential surface) of the tube body 7. The electrode portion 9 is formed integrally with the flange portion 8. The temperature difference setting portion 10 is configured to perform temperature control. The tube body 7, the flange portion 8, and the electrode portion 9 are made of platinum or a platinum alloy. The glass supply tubes 6a to 6d are each covered with a heat insulating material, for example, brick (not shown) in its entirety.

The tube body 7 is formed into a cylindrical shape, but is not limited to this shape. The flange portion 8 is formed into a disc shape, and is arranged so as to surround the entire circumference of the tube body 7. The flange portion 8 is fixed (welded) to the tube body 7 so as to be concentric with the tube body 7. The flange portion 8 is imaginarily divided into two parts on an upper side and a lower side with respect to a center line (hereinafter referred to as "first center line") X extending along a horizontal direction. A part positioned on the upper side with respect to the first center line X is hereinafter referred to as "first part 8a" and apart positioned on the lower side with respect to the first center line X is hereinafter referred to as "second part 8b". The first part 8a and the second part 8b are imaginarily divided into two parts on a right side and a left side with respect to a center line (hereinafter referred to as "second center line") Y (orthogonal to the first center line X) extending along a vertical direction.

The electrode portion 9 is formed integrally with the first part 8a of the flange portion 8. The electrode portion 9 has a plate shape having a linear part 9a and a tapered part 9b. The electrode portion 9 is formed integrally with the flange portion 8 through intermediation of the tapered part 9b. The electrode portion 9 is formed so as to protrude from the flange portion 8 along a radial direction of the flange portion 8. Specifically, the linear part 9a and the tapered part 9b of the electrode portion 9 are formed so as to be line-symmetric with respect to the second center line Y in the flange portion 8. The thickness of the electrode portion 9 is set to be the same as that of the flange portion 8. However, the present invention is not limited thereto, and the thickness of the electrode portion 9 may be different from that of the flange portion 8. The surface of the electrode portion 9 is formed so as to be flush with the surface of the flange portion 8.

As illustrated in FIG. 2, the temperature difference setting portion 10 comprises a first cooling device 11 and a second cooling device 12. The first cooling device 11 is provided in the first part 8a of the flange portion 8. The second cooling device 12 is provided in the second part 8b of the flange portion 8. The first cooling device 11 comprises a pair of cooling pipes 11a and 11b arranged on one surface of the first part 8a. The second cooling device 12 comprises a pair of cooling pipes 12a and 12b arranged on one surface (same surface as that of the first part 8a) of the second part 8b.

The cooling pipes 11a and 11b of the first cooling device 11 and the cooling pipes 12a and 12b of the second cooling device 12 are arranged so as to be line-symmetric with respect to the first center line X of the flange portion 8. A pumping device such as a compressor (not shown) is connected to each of the cooling pipes 11a, 11b, 12a, and 12b. The pumping device is configured to cause a predetermined cooling medium to flow through each of the cooling pipes 11a, 11b, 12a, and 12b. In this embodiment, a fluid, for example, water is used as a cooling medium, but the present invention is not limited thereto.

In this embodiment, each of the cooling pipes 11a, 11b, 12a, and 12b is formed by bending a copper tube, but the present invention is not limited thereto. Each of the cooling pipes 11a, 11b, 12a, and 12b is fixed to one surface of the flange portion 8 by welding. Each of the cooling pipes 11a, 11b, 12a, and 12b comprises a supply portion 13 and a discharge portion 14 for a cooling medium. In the radial direction of the flange portion 8, the supply portion 13 is positioned on an outer side, and the discharge portion 14 is positioned on an inner side. The supply portion 13 has a supply port 13a for a cooling medium, and the discharge portion 14 has a discharge port 14a for a cooling medium. The supply port 13a and the discharge port 14a may be formed as a joint portion so as to be connected to an additional pipe (not shown).

The supply port 13a and the discharge port 14a are arranged next to each other at a position in the vicinity of the linear part 9a of the electrode portion 9. Further, the supply portion 13 comprises a linear part 13b, a curved part 13c, and an inclined part 13d, and the discharge portion 14 comprises a linear part 14b, a curved part 14c, and an inclined part 14d. The linear parts 13b and 14b are arranged so as to correspond to the linear part 9a of the electrode portion 9. The curved parts 13c and 14c are arranged along a circumferential direction of the flange portion 8. The inclined parts 13d and 14d continue to the supply port 13a and the discharge port 14a, respectively. The supply portion 13 and the discharge portion 14 communicate to each other through an arc-shaped coupling part 15. Each of the cooling pipes 11a, 11b, 12a, and 12b forms a flow path for a cooling medium. The flow path comprises a going path formed in the supply portion 13 and a return path formed in the discharge portion 14.

Now, a method of manufacturing a glass sheet through use of a manufacturing apparatus having the above-mentioned configuration is described. In this method, the raw material glass is dissolved in the dissolving vessel 1 (dissolving step) to obtain the molten glass G, and the molten glass G is successively subjected to the fining step in the fining vessel 2, the homogenizing step in the homogenizing vessel 3, and the state adjusting step in the stage adjusting vessel 4. After that, the molten glass G is transferred to the forming vessel 5, and a glass sheet is formed from the molten glass in the forming step. After that, the glass sheet is subjected to the annealing step in the annealing furnace and the cutting step in the cutting device to be formed so as to have a predetermined dimension.

When the molten glass G is transferred through the glass supply tubes 6a to 6d, a voltage is applied to the electrode portion 9 to heat the tube body 7 in order to manage the temperature of the molten glass G flowing through the tube body 7. In this case, the temperature difference setting portion 10 causes a cooling medium to flow through the cooling pipes 11a and 11b of the first cooling device 11 and the cooling pipes 12a and 12b of the second cooling device 12 to cool the flange portion 8. The temperature difference setting portion 10 adjusts the flow rate of the cooling medium in the cooling pipes 11a and 11b of the first cooling device 11 and the flow rate of the cooling medium in the cooling pipes 12a and 12b of the second cooling device 12. Specifically, the temperature difference setting portion 10 sets the flow rate of the cooling medium in the second cooling device 12 to be larger than the flow rate of the cooling medium in the first cooling device 11.

Such flow rate control of the cooling medium may be performed, for example, while the temperature at a predetermined position of the first part 8a of the flange portion 8 and the temperature at a predetermined position of the second part 8b of the flange portion 8 are being measured, or may be performed based on temperature data (database) of the tube body 7 measured in advance. When the temperature of the flange portion 8 is measured, for example, in the first part 8a, it is desired that a sensor (for example, a thermocouple) be set at an intersection C1 between an extension line (two-dot chain lines) E of a peripheral edge portion of the flange portion 8 and the second center line Y. Further, in the second part 8b, it is desired that a sensor (for example, a thermocouple) be set at an intersection C2 between the peripheral edge portion of the flange portion 8 and the second center line Y.

The temperatures of the intersections C1 and C2 are measured, and a temperature difference therebetween can be measured. The flow rate control of the cooling medium may be performed while the temperature difference is being continuously measured. Alternatively, the relationship between the temperature difference and the temperature of the tube body 7 or the cooling medium may be prepared as a database in advance, and the flow rate of the cooling medium in the first cooing device 1 and the flow rate of the cooling medium in the second cooling device 12 may be determined based on the database. The temperature difference between the intersection C1 and the intersection C2 is preferably 40° C. or more and 200° C. or less, more preferably 50° C. or more and 150° C. or less.

The temperature difference between the first part 8a and the second part 8b is not limited to the foregoing, and may be set as described below. The temperature at an intersection C3 in a boundary portion between the outer circumferential surface of the tube body 7 and the first part 8a of the flange portion 8 with respect to the second center line Y is measured, and the temperature difference between the intersection C1 and the intersection C3 is regarded as the temperature of the first part 8a. Similarly, the temperature of an intersection C4 in a boundary portion between the outer peripheral surface of the tube body 7 and the second part 8b of the flange portion 8 with respect to the second center line Y is measured, and the temperature difference between the intersection C2 and the intersection C4 is regarded as the temperature of the second part 8b. The difference between the temperature of the first part 8a and the temperature of the second part 8b may be used as a reference value with respect to the flow rate control of the cooling medium. The measurement position of the temperature of the first part 8a and the measurement position of the temperature of the second part 8b may be appropriately set in accordance with the shape of the flange portion 8 and the position of the electrode portion 9 without being limited to the foregoing. A plurality of temperature measurement points may be set in the flange portion 8, and an average value thereof may be set as the temperature of the first part 8a and the second part 8b.

When the temperature of the second part 8b of the flange portion 8 is set to be lower than the temperature of the first part 8a of the flange portion 8 (the temperature of the first part 8a is set to be higher than the temperature of the second part 8b) by the temperature difference setting portion 10, a current flowing through the flange portion 8 can be suitably controlled. Specifically, the electrode portion 9 is arranged in the first part 8a of the flange portion 8, and hence the current density of the first part 8a is larger than the current density of the second part 8b. When the temperature of the first part 8a is set to be higher than the temperature of the second part 8b, the resistance value in the first part 8a can be increased to reduce the current density thereof.

With this, the difference in current density between the first part 8a and the second part 8b can be reduced to the extent possible. Thus, through adjustment of the temperature of the flange portion 8, the temperature of the tube body 7 can be accurately controlled.

Figure 3:
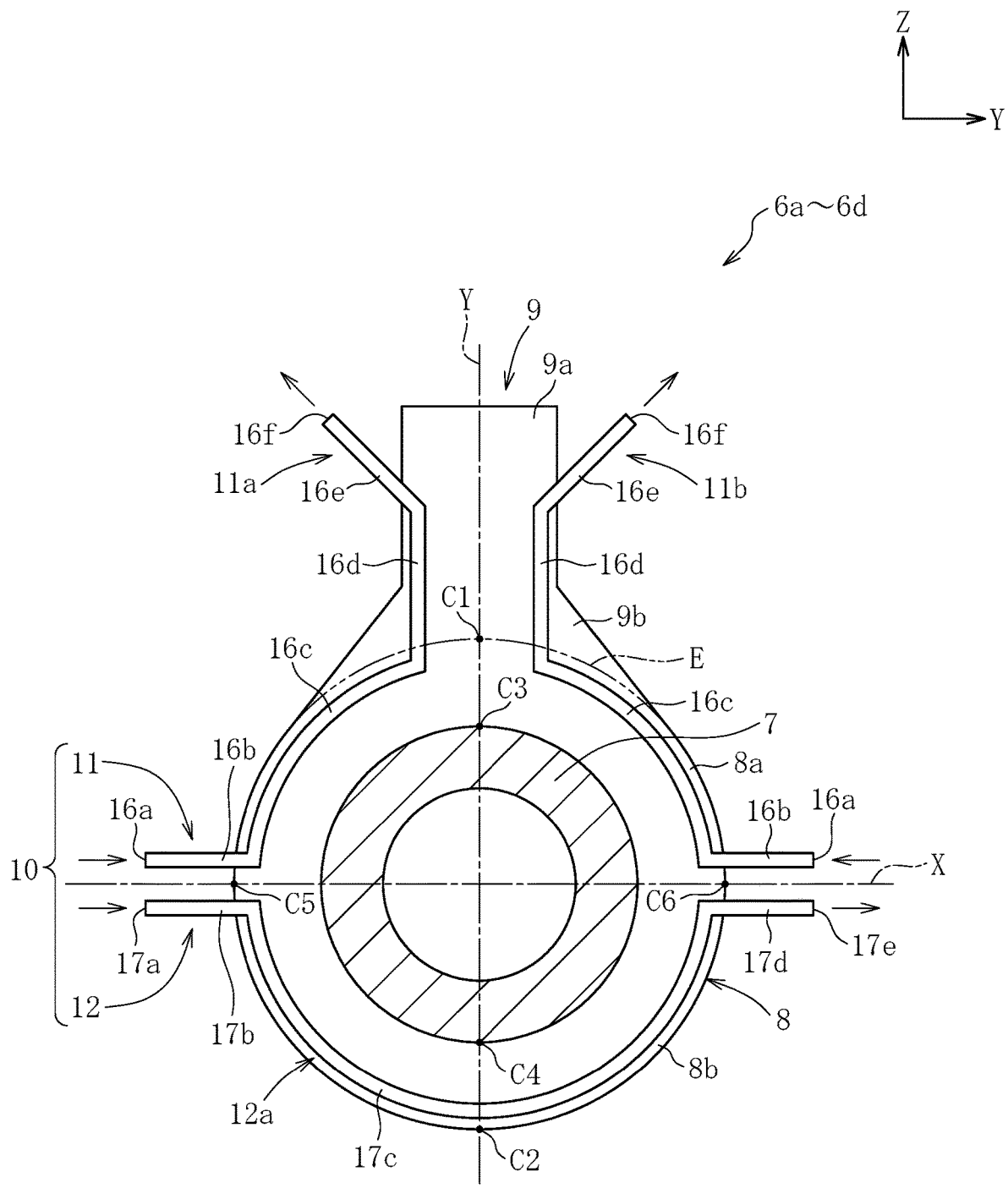
FIG. 3 is a sectional view for illustrating a main part of a glass supply tube according to another embodiment.

FIG. 3 is a view for illustrating a glass supply tube according another embodiment. In this embodiment, the configurations of the first cooling device 11 and the second cooling device 12 are different from those of FIG. 2. In this embodiment, the first cooling device 11 comprises two cooling pipes 11a and 11b, and the second cooling device 12 comprises one cooling pipe 12a. Therefore, the cooling pipes 11a and 11b of the first cooling device 11 and the cooling pipe 12a of the second cooling device 12 are asymmetric with respect to the first center line X of the flange portion 8. Each of the cooling pipes 11a and 11b of the first cooling device 11 comprises a supply port 16a, a linear part 16b, a curved part 16c, a second linear part 16d, an inclined part 16e, and a discharge port 16f. The linear part 16b is formed in the vicinity of an intersection (hereinafter referred to as "side end portion of the flange portion") C5 or C6 between the first center line X and the circumferential surface of the flange portion 8. The curved part 16c continues to the linear part 16b. The second linear part 16d continues to the curved part 16c and is formed along the linear part 9a of the electrode portion 9. The inclined part 16e continues to the second linear part 16d. The discharge port 16f is formed in an end portion of the inclined part 16e.

The cooling pipe 12a of the second cooling device 12 comprises a supply port 17a, a first linear part 17b, a curved part 17c, a second linear part 17d, and a discharge port 17e. The supply port 17a is formed in the vicinity of one side end part C5 of the flange portion 8. The first linear part 17b is formed substantially in parallel to the first linear part 16b of the one cooling pipe 11a of the first cooling device 11. The curved part 17c continues to the first linear part 17b. The second linear part 17d is formed substantially in parallel to the first linear part 16b of the other cooling pipe 11b of the first cooling device 11. The discharge port 17e is formed in the vicinity of the other side end part C6 of the flange portion 8, which is an end portion of the second linear part 17d.

In this embodiment, in the two cooling pipes 11a and 11b of the first cooling device 11, the cooling medium is caused to flow through the supply port 16a, the first linear part 16b, the curved part 16c, the second linear part 16d, the inclined part 16e, and the discharge port 16f in the stated order. Further, in the cooling pipe 12a of the second cooling device 12, the cooling medium is caused to flow through the supply port 17a, the first linear part 17b, the curved part 17c, the second linear part 17d, and the discharge port 17e in the stated order.

In this case, the flow rate of the cooling medium in the cooling pipe 12a of the second cooling device 12 is set to be larger than the flow rate of the cooling medium in the cooling pipes 11a and 11b of the first cooling device 11. Specifically, a temperature difference is caused between the first part 8a and the second part 8b of the flange portion 8. With this, the current density can be adjusted between the first part 8a and the second part 8b in the flange portion 8, and the temperature of the tube body 7 can be accurately controlled.

Figure 4:
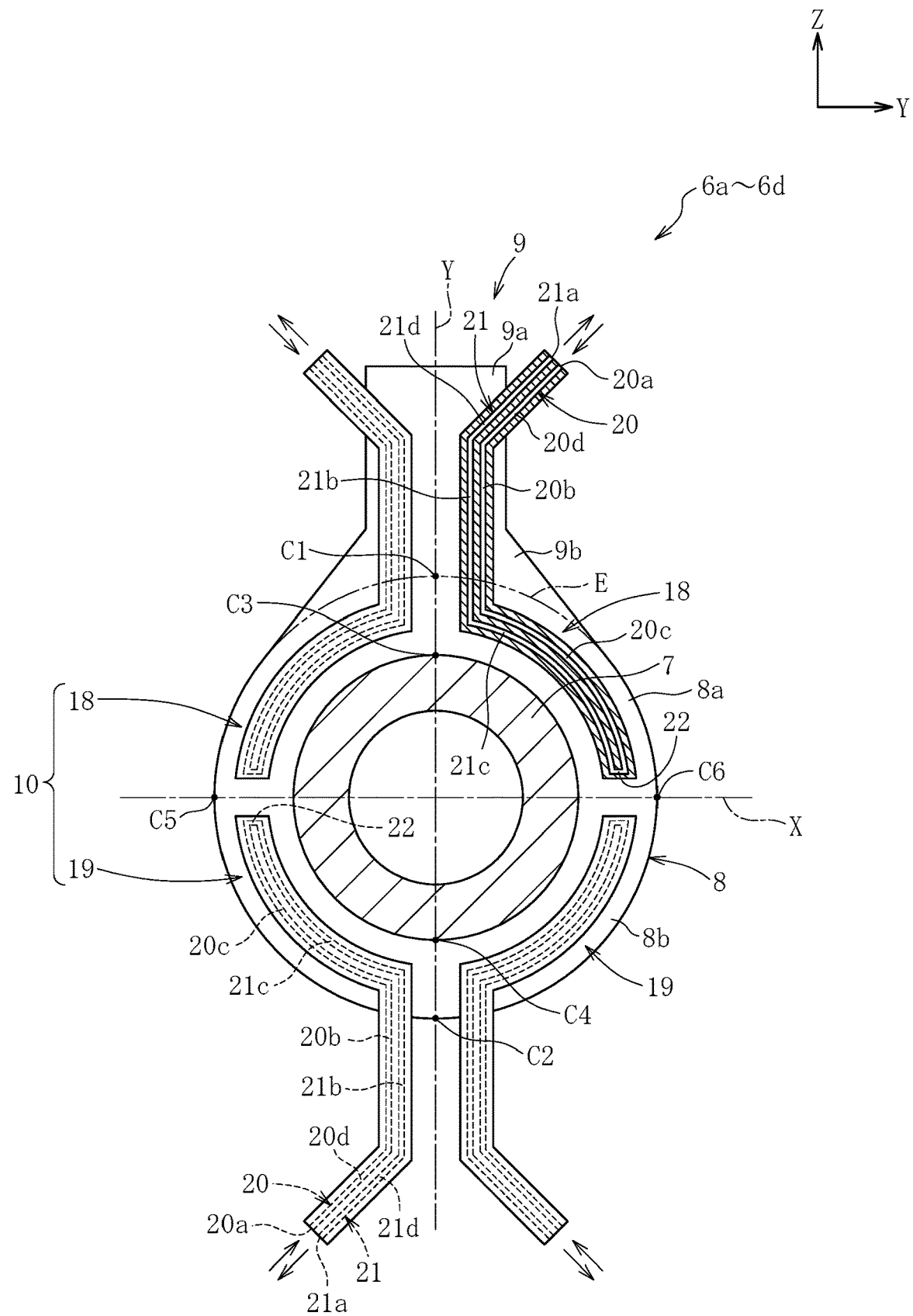
FIG. 4 is a sectional view for illustrating a main part of a glass supply tube according to another embodiment.

FIG. 4 is a view for illustrating a gas supply tube according to another embodiment. In the embodiments of FIG. 2 and FIG. 3, each of the cooling pipes 11a, 11b, 12a, and 12b of the cooling devices 11 and 12 is formed by bending a copper tube, but the cooling devices 11 and 12 according to this embodiment comprise cooling portions 18 and 19 each being formed of a block-shaped structure in which a flow path for a cooling medium is formed. Each of the cooling portions 18 and 19 is made of, for example, nickel, but is not limited thereto. In this embodiment, gas (air) is used as the cooling medium, but the present invention is not limited thereto.

The first cooling device 11 comprises a pair of cooling portions 18, and the second cooling device 12 comprises a pair of cooling portions 19. The cooling portions 18 of the first cooling device 11 and the cooling portions 19 of the second cooling device 12 are arranged on one surface of the flange portion 8 so as to be line-symmetric with respect to the first center line X of the flange portion 8. The flow path for the cooling medium formed in each of the cooling portions 18 and 19 comprises a supply portion (going path) 20 for the cooling medium and a discharge portion (return path) 21 for the cooling medium. The supply portion 20 and the discharge portion 21 communicate to each other through a coupling part 22. Each of the supply portions 20 comprises a supply port 20*a*, a linear part 20*b*, a curved part 20*c*, and an inclined part 20*d*. Each of the discharge portions 21 comprises a discharge port 21*a*, a linear part 21*b*, a curved part 21*c*, and an inclined part 21*d*.

In this embodiment, in each of the pair of cooling portions 18 of the first cooling device 11, the cooling medium is caused to flow from the supply portion 20 to the discharge portion 21 in the flow path in the cooling portion 18. Further, in each of the pair of cooling portions 19 of the second cooling device 12, the cooling medium is caused to flow from the supply portion 20 to the discharge portion 21 in the flow path in the cooling portion 18. In this case, the flow rate of the cooling medium in the cooling portion 19 of the second cooling device 12 is set to be larger than the flow rate of the cooling medium in the cooling portion 18 of the first cooling device 11. Specifically, a temperature difference is caused between the first part 8*a* and the second part 8*b* of the flange portion 8. With this, the current density can be adjusted between the first part 8*a* and the second part 8*b* in the flange portion 8, and the temperature of the tube body 7 can be accurately controlled.

The present invention is not limited to the configurations of the above-mentioned embodiments. In addition, the action and effect of the present invention are not limited to those described above. The present invention may be modified in various forms within the range not departing from the spirit of the present invention.

In the above-mentioned embodiments, the temperature difference setting portion 10 comprises the first cooling device 11 and the second cooling device 12, but the present invention is not limited thereto. The temperature difference setting portion 10 may comprise a first heating device provided in the first part 8*a* of the flange portion 8 and a second heating device provided in the second part 8*b* of the flange portion 8. When the first part 8*a* and the second part 8*b* are heated by the respective heating devices so that a temperature difference is caused therebetween, the temperature of the molten glass G that is caused to flow through the tube body 7 can be suitably managed in the same manner as in the above-mentioned embodiments.

In the above-mentioned embodiments, description is given of the configuration in which the flange portion 8 is divided into parts on the upper side and the lower side, with the part on the upper side being defined as the first part 8*a* and the part on the lower side being defined as the second part 8*b*. However, this configuration is described merely for an illustrative purpose, and the present invention is not limited to this configuration. For example, the flange portion 8 may be divided into parts on the upper side and the lower side, with apart on the lower side being defined as a first part having the electrode portion 9 provided therein and a part on the upper side being defined as a second part. Further, the flange portion 8 may be divided into parts on the right side and the left side, with one of parts on the right and left sides being defined as a first part and another part being defined as a second part. Specifically, the flange portion 8 can be divided into two parts by one imaginary straight line or curved line, with one of the divided two parts being defined as the first part (part having the electrode portion 9 provided therein) and another part being defined as the second part. Further, the flange portion 8 may be divided into a plurality of (three or more) parts by a plurality of imaginary straight lines or curved lines, with a part having the electrode portion 9 provided therein among the plurality of divided parts being defined as a first part and another parts being defined as a second part, a third part, and the like.

REFERENCE SIGNS LIST

1 dissolving vessel
5 forming vessel
6*a* glass supply tube
6*b* glass supply tube
6*c* glass supply tube
6*d* glass supply tube
7 tube body
8 flange portion
8*a* first part
8*b* second part
9 electrode portion
10 temperature difference setting portion
11 first cooling device
12 second cooling device
G molten glass

The invention claimed is:

1. A glass manufacturing apparatus, comprising:
 a dissolving vessel configured to dissolve a glass raw material to produce a molten glass;
 a forming vessel configured to form the molten glass into a predetermined shape; and
 a glass supply tube configured to convey the molten glass from the dissolving vessel to the forming vessel,
 the glass supply tube comprising:
  a tube body;
  a flange portion, which is arranged at an outer circumferential portion of the tube body and has a first part and a second part;
  an electrode portion arranged at the first part; and
  a temperature difference setting portion configured to cause a temperature difference between the first part and the second part,
 wherein the temperature difference setting portion comprises a first cooling device arranged at the first part and configured to cause a cooling medium to flow therethrough, and a second cooling device arranged at the second part and configured to cause a cooling medium to flow therethrough, and
 wherein the temperature difference setting portion is configured to set a temperature of the second part to be lower than a temperature of the first part by configuring a flow rate of the cooling medium in the second cooling device to be larger than a flow rate of the cooling medium in the first cooling device.

2. A glass supply tube, which is configured to convey a molten glass, the glass supply tube comprising:
 a tube body;
 a flange portion, which is arranged at an outer circumferential portion of the tube body and has a first part and a second part;
 an electrode portion arranged at the first part; and
 a temperature difference setting portion configured to cause a temperature difference between the first part and the second part,
 wherein the temperature difference setting portion comprises a first cooling device arranged at the first part and configured to cause a cooling medium to flow therethrough, and a second cooling device arranged at the second part and configured to cause a cooling medium to flow therethrough, and wherein the temperature difference setting portion is configured to set a temperature of the second part to be lower than a temperature of the first part by configuring a flow rate of the cooling medium in the second cooling device to be larger than a flow rate of the cooling medium in the first cooling device.

* * * * *